April 13, 1943.  LE ROY V. EDWARDS ET AL  2,316,677
THERMOMETER
Filed Sept. 30, 1941

LEROY V. EDWARDS
ROBERT E. TARRING
ALBERT A. WEISS, JR.
INVENTORS.

BY Ely & Pattison
ATTORNEYS.

WITNESS:

Patented Apr. 13, 1943

2,316,677

UNITED STATES PATENT OFFICE 2,316,677

THERMOMETER

Le Roy V. Edwards, Rockville Centre, Robert E. Tarring, Malverne, and Albert A. Weiss, Jr., Brooklyn, N. Y.

Application September 30, 1941, Serial No. 412,938

12 Claims. (Cl. 73—374)

This invention relates to improvements in thermometers, and more specifically to a sanitary dough thermometer.

In the scientific making of bread, it is the practice of the baker to ascertain the temperature of a batch of bread dough, and for such purpose, a dough thermometer is used. Such dough thermometers which have been heretofore used are definitely unsanitary due to the inability to thoroughly cleanse particles of dough from the corners and openings which are present therein. Therefore, one of the important objects of this invention is to provide a dough thermometer which is free from dirt catching corners and openings, and which is watertight to facilitate the immersion of the thermometer in water, whereby the thermometer may be easily kept in a clean and sanitary condition for use at all times.

Another feature of the invention in which the indicating thermometer tube and reading scale are enclosed in a plastic watertight casing by which moisture is prevented from causing corrosion of the reading scale which impairs its readability, and due to the insulating characteristics of the plastic material, fogging of the transparent casing is overcome, thus assuring a clear sight of the scale and the thermometer column at all times.

Another feature of the invention is the provision of a dough thermometer in which the reading portion of the glass mercury column is enclosed within a non-shatterable transparent plastic casing to prevent the danger of particles of mercury droplets or glass particles from getting into the dough or other food product should the column accidentally break during the use of the thermometer.

A further feature of the invention resides in a novel means of fixedly mounting the reading scale plate within a transparent cylindrical casing so as not to obstruct any portion of the mercury column and scale from the view of a reader.

A still further feature of the invention is to provide a sanitary dough thermometer which is simple in construction and assembly, which is easy to take apart for repair purposes, which is inexpensive of manufacture, and which is strong and durable for the purpose intended.

Other novel features of the invention will become apparent as the following specification is read in conjunction with the accompanying drawing, in which.

Figure 1:
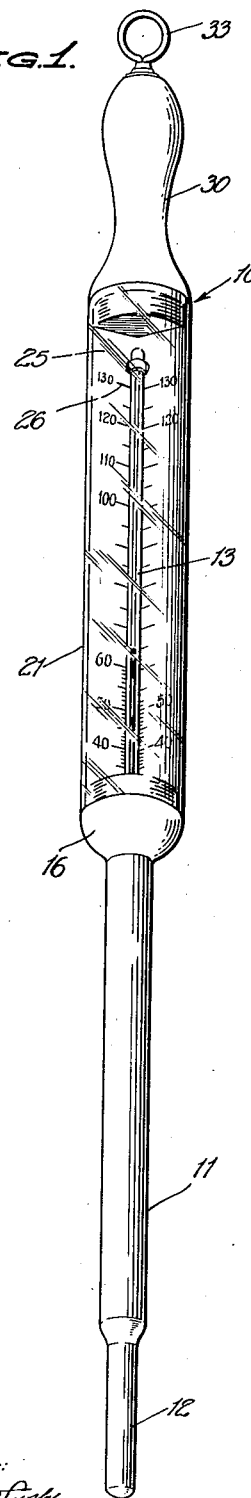
Figure 1 is a perspective view of a dough thermometer constructed in accordance with the invention.
Figure 2:
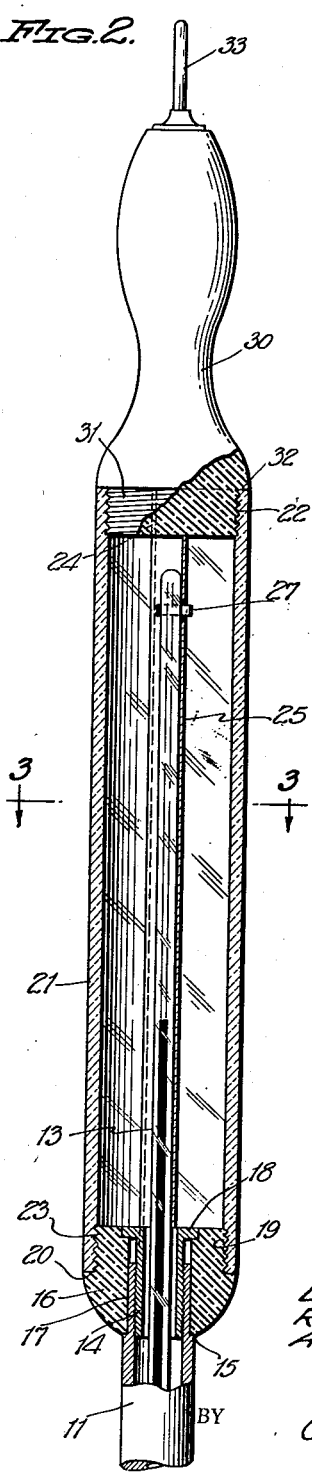
Figure 2 is an enlarged detail vertical longitudinal sectional view through the upper indicating portion of the thermometer.
Figure 3:
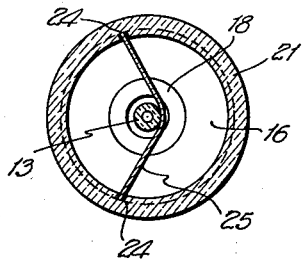
Figure 3 is an enlarged horizontal sectional view on the line 3—3 of Figure 2.

Referring to the drawing by reference characters, the numeral 10 designates the sanitary dough thermometer in its entirety which includes a hollow elongated metal stem 11, preferably made of stainless-steel and which is round in cross section throughout its length. The lower end is closed and is reduced in diameter as at 12 and encloses and is in heat exchange relation with the lower bulb end of a glass mercury column of tube 13, the upper indicating end of the tube rising above the top end of the stem and which freely passes through an externally screw threaded sleeve bushing 14. The upper end of the stem is internally screw threaded for threading engagement with the bushing. The upper end of the stem is reduced in external diameter to provide a shoulder 15 against which the lower end of a plastic end closure member 16 abuts. The closure member 16 is round in cross section and is provided with a central opening 17 for the passage of the bushing 14 and for telescoping the reduced upper end of the stem 11. The top flange 18 of the bushing is countersunk in an annular recess provided in the top face of the closure member 16. The upper portion of the member 16 is reduced in diameter and externally screw threaded as at 19, and said reduced portion provides an annular shoulder 20.

Surrounding the upper exposed portion of the column or tube 13 is a cylindrical transparent plastic casing 21 having a relatively thick wall and being of uniform external diameter and which is internally screw threaded at its top and bottom ends as at 22 and 23 respectively. Whereas various transparent plastics may be used for the making of the casing 21, we have found that good results have been obtained by making the casing of methyl-methacrylate, or, in other words, of a polymerized derivative of methacrylic, such as "Lucite," but any other highly transparent plastic substance having like characteristics may be used if desired. Such plastic material is highly transparent, non-shatterable, and has excellent insulating properties to prevent fogging when the ends of the casing are sealed against the admission of air and moisture. The lower threaded portion 23 of the casing is threaded to the threaded portion 19 of the lower closure member 16, and the end of the casing tightly abuts the shoulder 20 thereof. The outer periphery of the casing is flush with the exterior of the member 16 at the joint between the end of the casing and the shoulder 20 to avoid dirt collecting recesses or corners.

Figure 4:
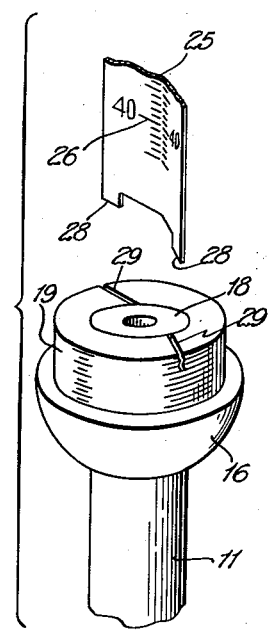
Figure 4 is a detail perspective view of a modification of the invention wherein the lower end of the scale plate and the coupling member have interfitting engagement with each other.

The inner wall of the cylindrical casing 21 is provided with a pair of opposed parallel grooves 24—24 which extend from the top edge of the casing to and into the lower threaded portion 23. The opposed grooves 24—24 are offset to one side of the axis of the casing to slidably receive the longitudinal edges of a metal scale plate 25 which is shown as substantially V-shape in cross section. The interfitting of the longitudinal edges of the scale plate with the grooves 24—24 acts to prevent accidental turning of the scale plates relative to the cylindrical casing. The concave side of the scale plate constitutes the front side and contains graduations 26 indicative of degrees of temperature. The exposed portion of the column or tube 13 is disposed within the crotch portion of the scale plate and has its upper end fastened thereto by a clip 27. If desired, and as illustrated in Figure 4, the bottom of the scale plate may be bifurcated to provide a pair of depending lugs 28—28 which respectively fit into kerfs 29—29 provided in the top face of the member 16 at opposite sides of the bushing flange 18. By such construction, the scale plate may be held against accidental turning, and the grooves 24—24 could be dispensed with. However, the bottom or inner end of the scale plate 25 abuts the inner end of the coupling or end closure 16. The top end of the scale plate 25 terminates on a plane adjacent the inner end of the threaded portion 22, and is engaged by the inner flat end of a handle member 30. The handle member 30 is also preferably made of a plastic substance and has its inner end reduced in diameter and screw threaded as at 31 for threading engagement with the threaded portion 22 of the casing. The reduced threaded end of the handle member also provides an annular shoulder 32 which engages the top end of the casing 21. The outer peripheral edge of the shoulder 32 coincides with the external diameter of the casing 21 so as to lie flush therewith when the handle member is tightly threaded to the casing. The handle member 30 is round in cross section throughout its length and has an eye 33 fixedly attached to the outer end thereof and by which the thermometer may be hung upon a hook or nail when not in use. The handle member 30 is preferably of a contrasting color from the dough or other product with which it is used for taking temperatures, so that it may easily be spotted in the event that the entire thermometer should accidentally become submerged into the product.

In use, the operator grasps the handle 30 and inserts the stem 11 into the batch of dough or other substance whose temperature is desired to be known. After permitting the stem 11, which encloses the bulb end of the mercury column or tube 13, to remain in the substance, a reading is taken between the top of the mercury column and the graduated scale plate 25. After use, the operator may immerse the entire thermometer 10 into a bath of water, and wipe the same dry for sanitary reasons. The threaded connections between the ends of the casing 21 and the end closures 16 and 30 provide a watertight seal to prevent the entry of moisture into the casing which might cause the scale plate 25 to rust, and which would also cause fogging of the transparent casing and prevent a clear view for a temperature reading. By eliminating all corners, recesses, and openings throughout the exterior of the thermometer 10, we avoid any likelihood of dirt, dough, or other foreign matter from accumulating thereon and which would cause contamination with pure substances upon subsequent use of the thermometer.

The simplicity of construction and assembly will be readily appreciated which permits of the inexpensive replacement of worn or damaged parts as and when the occasion demands.

Whereas we have illustrated and described our invention embodied in a dough thermometer having a straight stem 11, the invention may be applied to thermometers where the thermal stem extends angularly relative to the longitudinal axis of the casing. Also, the ends of the casing 21 have been referred to as "top" and "bottom" due to the vertical positions of the thermometer 10 as shown in the drawing, but the thermometer when in use may be disposed at positions other than that shown. The term "outer" and "inner" may be respectively used in lieu of "top" and "bottom." Furthermore, by reason of constructing the cylindrical casing 21 and end closures 16 and 30 of plastics, the same may be connected together by an adhesive and the screw threading of the parts eliminated.

While we have shown and described what we consider to be the preferred embodiment and use of our invention, we wish it to be understood that such changes in construction and other uses of the invention as come within the scope of the appended claims may be resorted to if desired without departing from the spirit of the invention.

Having thus described the invention, what we claim as new and desire to secure by Letters Patent of the United States, is:

1. A sanitary thermometer having a hollow stem closed at its outer end and open at its inner end, a thermometer tube extending through and beyond the open end of said stem to provide an exposed portion, a transparent cylindrical casing surrounding the exposed portion of the tube, a coupling between the inner end of said casing and the inner open end of said stem, a grip handle connected to and closing the outer end of the cylindrical casing, and a scale plate having graduations on the front face thereof, said scale plate being positioned with its face side adjacent said tube, and interfitting means between the side edges of the scale plate and the inner walls of the casing for rigidly securing the same in position within the casing.

2. A sanitary thermometer having a hollow metal stem open at its inner end, a thermometer tube having an outer lower portion contained within said stem and an inner indicating portion extending through and beyond the open end of said stem, said tube being disposed axially of the stem, a transparent cylindrical casing of a diameter greater than said tube enclosing the indicating portion of said tube and being spaced therefrom in concentric relation thereto, a smooth rounded coupling connecting the inner end of said stem to the inner end of said casing, a handle member connected to and closing the outer end of said casing, the said handle member being flush with the exterior peripheral edge of the casing at its point of connection therewith, and a scale plate having its front face provided with graduations, said scale plate being fixedly mounted within said casing with its front graduated face in close proximity to the upper indicating portion of said tube.

3. A thermometer comprising in combination, a transparent cylindrical casing having a relatively thick wall, a hollow stem connected to and extending from the lower end of said casing and co-axial therewith, a thermometer tube having its lower portion enclosed in said stem and its upper portion extending axially into said casing in spaced relation to the side walls thereof, the walls of said transparent cylindrical casing having opposed grooves on the interior surface and extending the length thereof, a scale plate having its front face graduated, the side edges of said scale plate being respectively seated in said opposed grooves with its graduated face adjacent the upper portion of the tube, and an end closure member connected to and closing the top end of said casing.

4. In a thermometer, a transparent plastic cylindrical casing internally screw threaded at its top and bottom ends, a plastic bottom end closure threaded to the bottom end of said casing and flush with the outer peripheral edge of the casing, said bottom end closure having a central opening therein, a hollow metal stem having its upper end fitting into said opening, means fixedly securing the upper end of the stem to said bottom end closure, a mercury tube having its lower portion disposed within said stem and its upper portion rising upwardly through the central opening and into said casing axially thereof, a scale plate having its front face graduated, said scale plate being fixedly mounted within said casing with its front graduated side facing said tube, and a plastic handle member having its inner end threadedly connected with the top threaded end of the casing and being flush with the outer periphery thereof at the joint therebetween.

5. In a thermometer, a transparent plastic cylindrical casing having a relatively thick side wall which is internally screw threaded at opposite ends, a pair of plastic end closures respectively threadedly connected to the threaded ends of the casing, a thermometer tube passing through an opening in one of the end closures and disposed axially with respect to said casing, the walls of said transparent cylindrical casing having opposed grooves on the interior surface and extending the length thereof, and a scale plate having graduations on the front side thereof, said scale plate having its longitudinal side edges seated in said opposed grooves with its graduated side facing said tube, the ends of said scale plate abutting the inner ends of the respective end closures.

6. In a thermometer, a transparent cylindrical casing, a pair of end closures threaded to the respective ends of said casing, a mercury thermometer tube extending into and disposed axially of said casing, the walls of said transparent cylindrical casing having opposed grooves on the interior surface and extending the length thereof and a graduated scale plate having its longitudinal edges seated in said grooves and its ends respectively abutting the end closures.

7. In a thermometer, a transparent cylindrical casing, a pair of end closures threaded to the respective ends of said casing, one of said end closures having an opening axially thereof, a sleeve member in said opening and terminating flush with the inner end of the end closure, a mercury thermometer tube extending through the sleeve member into said casing, a graduated scale plate of substantially V-shape in cross section and being of a length equal to the distance between the inner ends of the end closures, and spaced lugs provided on one of the ends of said scale plate and respectively seated in kerfs provided in the inner end of the adjacent end closure, to prevent turning of the scale plate relative to the last named end closure, the intermediate portion of the scale plate between the lugs bridging the inner end of the sleeve member.

8. In a sanitary thermometer having a transparent thermometer casing, a hollow metal stem connected to and extending from one end of said casing, a mercury thermometer tube having its lower end disposed in said hollow stem and its other end rising into said thermometer casing, and a hand grip connected to and extending from the other end of said casing, said casing, stem, and hand grip all being externally round in cross section and flush at their respective points of connection.

9. In a thermometer, a transparent plastic cylindrical casing open at its ends, top and bottom plastic end closure members respectively fitting into and closing the open ends of said casing and being flush with the outer peripheral end edges thereof, the bottom end closure member having a central opening therein, a hollow metal stem having its inner end fitting into said opening, means rigidly securing the inner end of said stem to said bottom closure member, a mercury tube having its outer portion disposed within said stem and its inner portion rising upwardly through the central opening and into said casing, and a scale plate having its front face graduated, said scale plate being fixedly mounted within said casing with its front graduated side facing said tube.

10. In a thermometer, a transparent plastic cylindrical casing of uniform diameter open at its ends, the walls of said transparent plastic cylindrical casing having opposed grooves on the interior surface and extending substantially the length thereof from one open end of the casing, a graduated scale plate having its longitudinal edges respectively seated in said grooves, and a pair of plastic end closures fitting into and closing the respective ends of said casing and having their inner ends abutting the respective adjacent ends of the scale plate.

11. A sanitary dough thermometer comprising in combination, a transparent cylindrical casing constructed of a highly transparent plastic substance and being of a uniform external diameter throughout its length and open at its opposed ends, internal screw threads at the ends of the casing, a handle member having a reduced threaded extension at its inner end defining a shoulder, said handle member being round in cross section, the outer edge of the shoulder being of the same diameter as the external diameter of the casing, the threaded extension being threaded to the upper threaded end of the casing with the shoulder tightly seated against the upper end of the casing, a closure member for the lower end of the casing which is round in cross section and being provided with an axial opening, a reduced threaded extension provided on the inner end of the closure member defining an annular shoulder, the outer edge of the last named shoulder being of the same diameter as the external diameter of the casing, the last named threaded extension being threaded to the lower threaded end of said casing with the last named shoulder tightly seated against the lower end of said casing, a hollow metal stem having its upper end extending into the opening in the end closure, means fixedly securing the metal stem to the end closure, a mercury tube having its lower end disposed in said stem and its upper end extending within said casing short of the reduced extension of the handle member, and a scale plate mounted within said casing rearward of the mercury tube with its ends respectively abutting the inner ends of the reduced threaded extension.

12. A sanitary dough thermometer as set forth in claim 11, in which the walls of said cylindrical casing have opposed grooves on the interior surface which extend from the upper edge thereof to a point adjacent the lower end of the casing, said grooves receiving the longitudinal edges of the scale plate to prevent turning movement of the scale plate relative to the cylindrical casing LE ROY V. EDWARDS.
ROBERT E. TARRING.
ALBERT A. WEISS, Jr.